United States Patent
Perlman et al.

(10) Patent No.: US 9,659,190 B1
(45) Date of Patent: May 23, 2017

(54) STORAGE SYSTEM CONFIGURED FOR ENCRYPTION OF DATA ITEMS USING MULTIDIMENSIONAL KEYS HAVING CORRESPONDING CLASS KEYS

(71) Applicant: EMC Corporation, Hopkinton, MA (US)

(72) Inventors: Radia Perlman, Redmond, WA (US); Xuan Tang, Hopkinton, MA (US); Greg Lazar, Upton, MA (US); Thomas Dibb, Rutland, MA (US); Naizhong Chiu, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 75 days.

(21) Appl. No.: 14/752,059

(22) Filed: Jun. 26, 2015

(51) Int. Cl.
*G06F 12/14* (2006.01)
*G06F 21/78* (2013.01)
*G06F 21/62* (2013.01)
*H04L 9/08* (2006.01)

(52) U.S. Cl.
CPC .......... *G06F 21/78* (2013.01); *G06F 12/1408* (2013.01); *G06F 21/6218* (2013.01); *H04L 9/0816* (2013.01); *G06F 2212/402* (2013.01)

(58) Field of Classification Search
None
See application file for complete search history.

(56) References Cited

U.S. PATENT DOCUMENTS

| | | | |
|---|---|---|---|
| 6,577,734 B1 | 6/2003 | Etzel et al. | |
| 7,814,318 B1 | 10/2010 | Perlman et al. | |
| 8,650,657 B1 | 2/2014 | Shankar et al. | |
| 2003/0002668 A1 | 1/2003 | Graunke et al. | |
| 2005/0018853 A1 | 1/2005 | Lain et al. | |
| 2006/0282666 A1 | 12/2006 | Kim | |
| 2006/0288232 A1 | 12/2006 | Ho et al. | |
| 2007/0226809 A1 | 9/2007 | Ellard | |
| 2007/0245410 A1 | 10/2007 | Perlman et al. | |

(Continued)

FOREIGN PATENT DOCUMENTS

EP   1414181 A1   4/2004

OTHER PUBLICATIONS

Radia Perlman, "File System Design with Assured Delete," 14th Annual Network and Distributed System Security Symposium (NDSS), Feb.-Mar. 2007, 13 pages.

*Primary Examiner* — Brandon Hoffman
(74) *Attorney, Agent, or Firm* — Ryan, Mason & Lewis, LLP

(57) ABSTRACT

An apparatus comprises a storage system and a key manager incorporated in or otherwise associated with the storage system. The storage system is configured to store data items across a plurality of dimensions with each such dimension comprising a plurality of classes. The key manager is configured to assign class keys to respective ones of the classes of each of the dimensions. A given one of the data items associated with at least one of the classes in each of two or more of the dimensions is encrypted for storage in the storage system using a multidimensional key determined as a function of the class keys corresponding to respective ones of the classes with which that data item is associated. Such an arrangement allows all of the data items associated with a given one of the classes to be deleted by deleting the class key assigned to the given class.

21 Claims, 2 Drawing Sheets

(56) References Cited

U.S. PATENT DOCUMENTS

| | | |
|---|---|---|
| 2009/0110191 A1 | 4/2009 | Sanvido et al. |
| 2010/0054479 A1* | 3/2010 | Kao .................. G06F 21/10 380/279 |
| 2011/0158405 A1 | 6/2011 | Choi et al. |
| 2011/0283113 A1 | 11/2011 | Moffat et al. |
| 2012/0284528 A1 | 11/2012 | Orovitz |
| 2013/0305057 A1 | 11/2013 | Greco et al. |
| 2013/0322621 A1 | 12/2013 | Yoon et al. |
| 2014/0006802 A1 | 1/2014 | Cachin et al. |
| 2014/0025963 A1 | 1/2014 | Subramanian |
| 2014/0068257 A1 | 3/2014 | Burckard |
| 2014/0351605 A1 | 11/2014 | De Atley et al. |
| 2014/0359309 A1 | 12/2014 | Cachin et al. |
| 2015/0019870 A1 | 1/2015 | Patnala et al. |

\* cited by examiner

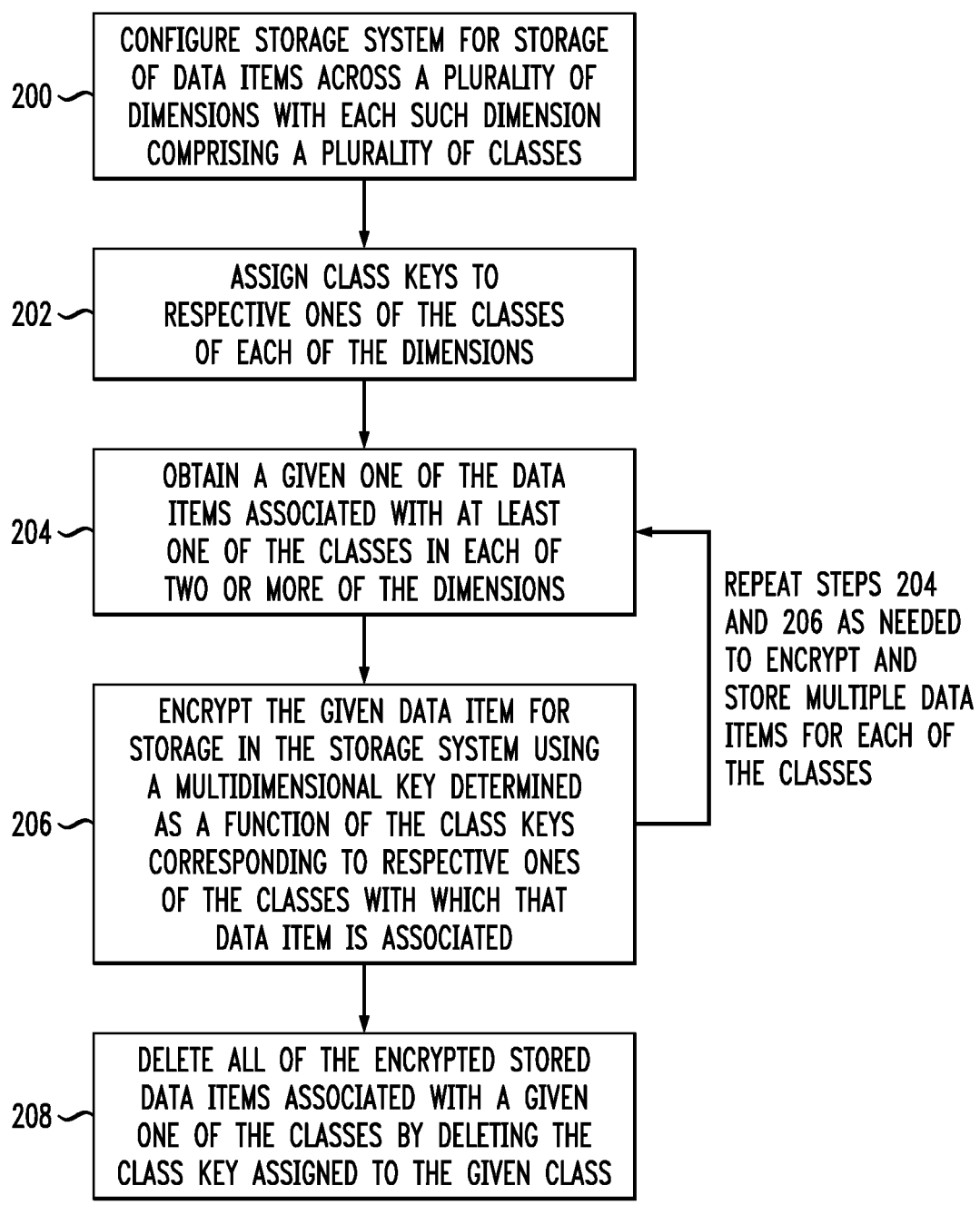

STORAGE SYSTEM CONFIGURED FOR ENCRYPTION OF DATA ITEMS USING MULTIDIMENSIONAL KEYS HAVING CORRESPONDING CLASS KEYS

FIELD

The field relates generally to storage systems, and more particularly to storage systems that utilize data encryption.

BACKGROUND

In many storage systems, data is stored under encryption utilizing one or more cryptographic keys, which are more generally referred to herein as "master keys." However, problems can arise in such systems in regard to "shredding" of stored encrypted data items, where shredding generally refers to effectively rendering unreadable or otherwise deleting a given stored encrypted data item through deletion of its associated master key. More particularly, shredding of stored encrypted data items under conventional practice can be unduly complex, in that it typically involves decryption of all data items to be retained followed by corresponding re-encryption of the retained data items using a new master key. This can significantly undermine the performance of the storage system, particularly for systems that store large amounts of data or are subject to frequent deletion of data items.

SUMMARY

Illustrative embodiments of the invention provide storage systems configured for encryption of data items using multidimensional keys having corresponding class keys so as to facilitate efficient shredding of stored encrypted data items.

In one embodiment, an apparatus comprises a storage system and a key manager incorporated in or otherwise associated with the storage system. The storage system is configured to store data items across a plurality of dimensions with each such dimension comprising a plurality of classes. The key manager is configured to assign class keys to respective ones of the classes of each of the dimensions.

A given one of the data items associated with at least one of the classes in each of two or more of the dimensions is encrypted for storage in the storage system using a multi-dimensional key determined as a function of the class keys corresponding to respective ones of the classes with which that data item is associated.

Such an arrangement in some embodiments advantageously allows all of the data items associated with a given one of the classes to be deleted by deleting the class key assigned to the given class. This type of efficient shredding process can provide substantial performance improvements in storage systems that store large amounts of data or are subject to frequent deletion of data items.

These and other embodiments include, without limitation, systems, apparatus, methods and processor-readable storage media.

BRIEF DESCRIPTION OF THE DRAWINGS

FIG. 2 is a flow diagram of an example process for deletion of encrypted stored data items associated with a given class in an illustrative embodiment.

DETAILED DESCRIPTION

Figure 1:
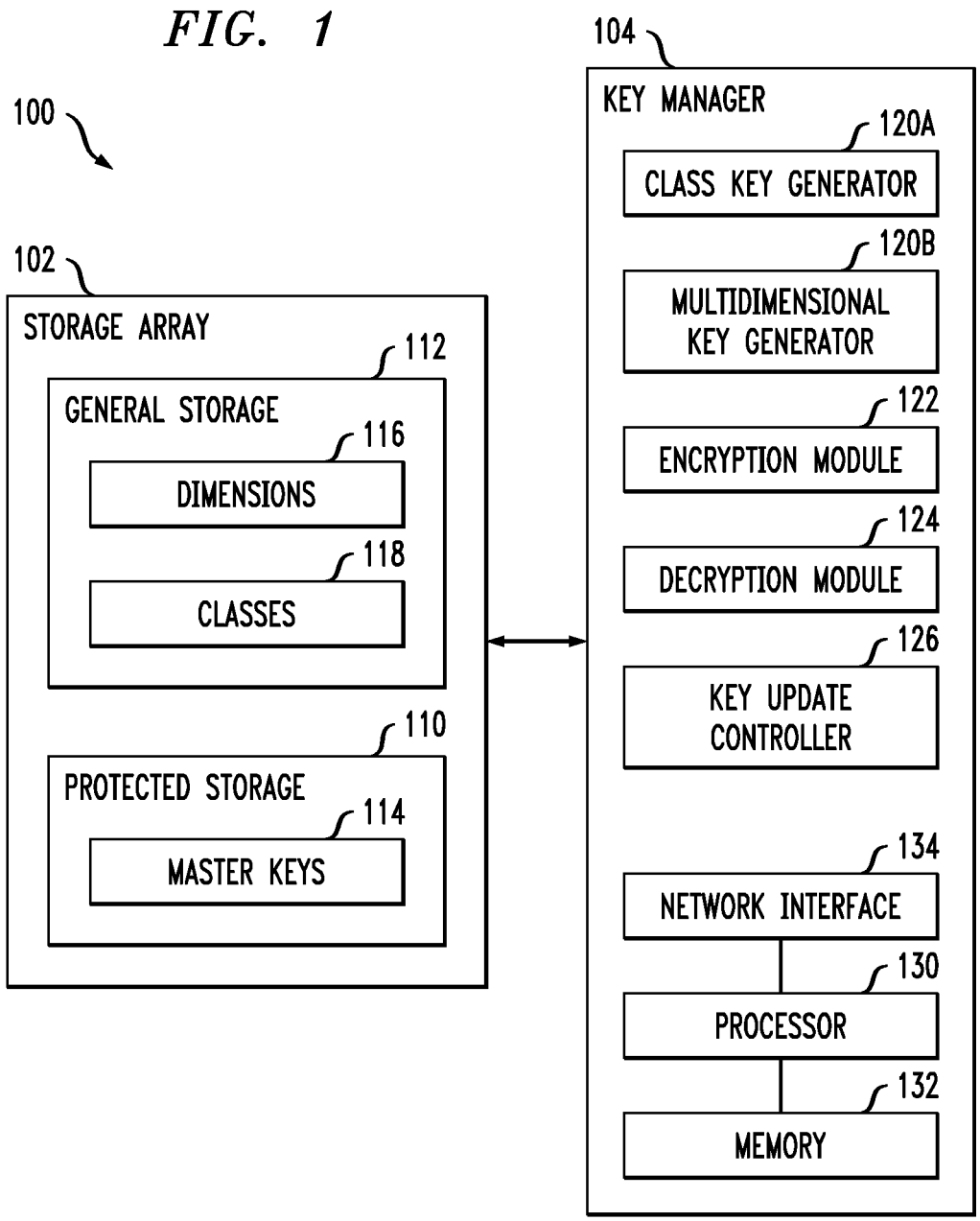
FIG. 1 is a block diagram of a storage system configured for encryption of data items using multidimensional keys having corresponding class keys in an illustrative embodiment of the invention.

Illustrative embodiments of the present invention will be described herein with reference to exemplary storage systems and associated processing devices. It is to be appreciated, however, that embodiments of the invention are not restricted to use with the particular illustrative system and device configurations shown. Accordingly, the term "storage system" as used herein is intended to be broadly construed, so as to encompass, for example, storage systems comprising storage arrays or other types and arrangements of storage products as well as cloud storage systems comprising virtual infrastructure.

FIG. 1 shows a storage system 100 configured in accordance with an illustrative embodiment of the present invention. The storage system 100 comprises a storage array 102 coupled to a key manager 104. Although the key manager 104 is shown as being separate from the storage array 102 in this embodiment, in other embodiments the key manager 104 may be at least partially incorporated into the storage array 102. Such an arrangement of a storage array comprising an internal key manager is considered an example of a "storage system" as that term is broadly utilized herein.

The storage array 102 comprises protected storage 110 and general storage 112. The protected storage 110 and the general storage 112 are examples of what are more generally referred to herein as respective first and second storage of the storage system. Such first storage is of a first type and second storage is of a second type, with the first storage providing enhanced data protection relative to the second storage. For example, in the present embodiment, it is assumed that data items are stored in encrypted form in the general storage 112, but that the protected storage 110 provides enhanced data protection relative to that provided by encrypted storage in the general storage 112.

The protected storage 110 may therefore comprise a trusted platform module or other highly secure module that provides the highest level of data protection available in the storage system 100. Additionally or alternatively, the protected storage 110 may provide stronger encryption than that provided for data items stored in the general storage 112. This stronger encryption may involve, for example, use of multiple encryption layers or other cryptographic techniques familiar to those skilled in the art.

In some embodiments, at least a portion of the protected storage 110 may comprise a secure database of the key manager 104. An embodiment of this type may be considered an example of an arrangement in which the key manager 104 is at least partially incorporated within the storage array 102.

As maintenance of the protected storage 110 can be complex in some embodiments, it is often desirable to minimize the amount of information that must be stored there. The encrypted stored data items in the general storage 112 are not subject to the same restrictions, and in some embodiments can even be replicated widely.

The protected storage 110 stores one or more master keys that are illustratively used in generating class keys or multidimensional keys as described herein. Additionally or alternatively, the master keys 114 stored in protected storage 110 can include at least a subset of the class keys and the multidimensional keys. The term "master key" as used herein is intended to be broadly construed so as to encompass a cryptographic key utilized in performing cryptographic operations such as encryption or decryption within the storage system 100, and such a master key may include a class key or a multidimensional key. In other embodiments, the protected storage 110 and the one or more master keys 114 can be eliminated, and the system 100 can be configured to operate using class keys and multidimensional keys that are not based on any master key and are not stored in protected storage.

The storage array 102 in the present embodiment is configured to store data items in encrypted form in general storage 112 across a plurality of dimensions 116 with each such dimension comprising a plurality of classes 118.

The dimensions 116 in some embodiments can be viewed as being "orthogonal" to one another, in that each of the classes 118 only appears in one of the dimensions 116. Thus, the dimensions in such an embodiment illustratively comprise disjoint subsets of the classes 118. As a result, data items in one class in a given dimension can be easily shredded regardless of the other classes that may be associated with those data items in other dimensions. Other arrangements of dimensions and classes can be used in other embodiments.

The key manager 104 is configured to assign class keys to respective ones of the classes 118 of each of the dimensions 116. The dimensions may illustratively comprise one or more of storage drive, customer and security level.

More particularly, an arrangement with all three of these example dimensions may more particularly include j classes within the storage drive dimension, k classes within the customer dimension, and n classes within the security level dimension, such that there is a total of j+k+n class keys. For example, if there are 2000 storage drives in the storage array 102, there would be 2000 class keys in the storage drive dimension, one for each storage drive. Similarly, if there are 100000 customers, there would be 100000 class keys in the customer dimension, one for each customer, and if there are 7 security levels, there would be 7 class keys in the security level dimension. Assume for purposes of further description below that the storage devices in this example are denoted D1, D2, . . . D2000, that the customers are denoted C1, C2, . . . C100000 and that the security levels are denoted S1, S2, . . . S7.

A given one of the data items associated with at least one of the classes in each of two or more of the dimensions is encrypted for storage in the storage array 102 using a multidimensional key determined as a function of the class keys corresponding to respective ones of the classes with which that data item is associated.

The phrase "determined as a function of the class keys" in this context and elsewhere herein with reference to a multidimensional key is intended to be broadly construed so as to encompass, for example, arrangements in which a multidimensional key is generated from its associated class keys as well as arrangements in which a multidimensional key is decrypted or unwrapped using its associated class keys.

Returning to the above example having storage drive, customer and security level dimensions, assume that a particular data item is stored on drive D2 for customer C12 at security level L3. The corresponding multidimensional key utilized to encrypt that data item for storage in general storage 112 is determined as a function of keys KD2, KC12 and KL3 which denote the respective class keys for classes D2, C12 and L3.

In some embodiments, the multidimensional key used to encrypt the given data item comprises a cryptographic hash of the class keys corresponding to respective ones of the classes with which that data item is associated, although numerous other techniques can be used to generate a given multidimensional key from its associated class keys. As another example, the multidimensional key can be generated through application of a sequential wrapping process to a random number with each iteration of the sequential wrapping process using a different one of the associated class keys.

As will be described in more detail below, such an arrangement advantageously allows all of the data items associated with a given one of the classes to be deleted by deleting the class key assigned to the given class, without requiring decryption and re-encryption of any encrypted stored data items in any other ones of the classes.

Thus, with reference to the above-noted example arrangement, all of the data items on a particular storage drive, or of a particular customer, or at a particular security level, and various combinations thereof, can be efficiently deleted from the storage system by deletion of the corresponding class keys. For example, all data items associated with the highest security level L7 can be deleted from the storage system 100 by deleting the corresponding class key KL7. Such class-based deletion is readily scalable to larger numbers of dimensions, as the total number of class keys required for a given implementation is substantially linear in the number of dimensions and the number of classes per dimension.

Additionally or alternatively, selected ones of the encrypted data items can be provided to a recipient along with a subset of the class keys selected to limit readability of the encrypted data items to only those of the encrypted data items that are associated with the provided subset of the class keys and thereby authorized to be read by the recipient. Such an arrangement can be used to effectively "redact" data from a set of data items that are forwarded to a recipient, such as personally identifiable information (PII) or company confidential information that the recipient is not authorized to access. It should be noted that the term "recipient" in this context is intended to be broadly construed, and may encompass a user device or administrator terminal, or other type of automated recipient.

The FIG. 1 storage arrangement based on encryption of data items using multidimensional keys determined as a function of class keys in some implementations bounds the total number of assigned class keys by a sum of the total numbers of classes in respective ones of the plurality of dimensions.

It is possible that at least one of the dimensions 116 includes at least one class that has no assigned class key. For example, in an implementation in which a security level dimension includes three classes, such as a first class denoting PII, a second class denoting company confidential information and a third class denoting publicly available information, the latter class need not have any class key. As another example, a security level dimension can include classes for "completely public," "company confidential but sharable with partner companies," "company confidential for internal use only" and "company confidential with need to know." In this example, there could be a class key for each of the security levels other than "completely public." Numerous alternative dimensions each having one or more classes without any assigned class key are possible.

One or more of the dimensions 116 can each comprise a sequential arrangement of classes associated with respective hierarchically-arranged access levels such that an assigned class key for one of the classes corresponding to a particular access level permits readability of encrypted data items associated with that class as well as encrypted data items associated with classes corresponding to lower access levels.

The security level dimension comprising classes S1, S2, ... S7 as described previously may be viewed as an example of a dimension that includes a linear arrangement of classes. This type of dimension makes it possible to render all data items at or above a designated class level unreadable.

In an arrangement of this type, the class key for the particular access level may be determined as a cryptographic hash of the class keys for the lower access levels, or as a sequential wrapping of the class keys for the lower access levels.

For example, a single class key can be stored for a highest one of the access levels, with class keys for the lower access levels being determined by repeated application of a cryptographic hash to the single class key.

As a more particular example, assume again in a given embodiment that a security level dimension comprises the classes S1, S2, ... S7. Further assume that access to data items up to and including a given level or class is obtained by obtaining access to the corresponding class key. Thus, for example, data items for levels S1, S2, S3 and S4 can be accessed by a user that has access to class key KS4. Similarly, to delete all data items at level S5 and higher, simply delete the corresponding class keys S5 through S7.

In this example, the class key for a given level k can be generated as a hash of all the class keys for the previous levels, as in h(KS1, KS2, ... KSk), where h(·) denotes a hash function. Alternatively, the encrypted stored data items at level k can be wrapped multiple times, once for every lower level, using the corresponding class keys.

It is possible to store only a single class key KSk for the highest level, with the lower level class keys being derived as a one-way hash of KSk. Accordingly, if a user has access to class key KS7, the class key KS6 is given by h(KS7). Similarly, the class key KS5 is given by h(KS6). In an arrangement of this type, there is only a single class key for the security level dimension. To redact all data above level S4, for example, the recipient would be sent h(h(h(KS7))), which is KS4. The recipient can then easily derive the class keys KS3, KS2 and KS1 from KS4 by respective further applications of the hash function.

It is further assumed in the FIG. 1 embodiment that a given data item encrypted for storage in general storage 112 of storage array 102 using a multidimensional key has corresponding metadata indicating at least a subset of the classes with which that data item is associated. The metadata for the given data item illustratively comprises the multidimensional key encrypted as a function of the class keys corresponding to respective ones of the classes with which that data item is associated.

For example, the multidimensional key may be encrypted using a cryptographic hash of the class keys corresponding to respective ones of the classes with which the given data item is associated.

As another example, the multidimensional key may be encrypted by sequentially wrapping the multidimensional key using the class keys corresponding to respective ones of the classes with which the given data item is associated.

The metadata for a given data item in some embodiments indicates the class or classes to which the data item belongs in each of the dimensions. It is possible, however, that at least one of the classes for the given data item may be inferred without being explicitly specified in the metadata for that data item. For example, a given customer may only store data on a certain storage drive in a given system implementation. As another example, data having a certain security level may only be stored on a certain storage drive.

In an embodiment in which encrypted data items are sent to a recipient, the encrypted data items and their associated metadata are sent, along with only those class keys that enable decryption of the particular encrypted data items that the recipient is authorized to read. As mentioned above, this may be viewed as a form of data redaction specifically tailored to a particular recipient.

Assume by way of example that the metadata associated with data items stored on a particular storage drive indicates all of the classes with which those data items are associated. For example, only customers C15, C688 and C712 have data stored on drive D2. And each customer has data items only for certain security levels, as follows:

C15: S2, S7
C688: S1, S2, S3
C712: S6, S7

A given data item on storage drive D2 might therefore contain as metadata identifiers of the classes C712 and S6, indicating that the given data item belongs to customer C712, and is at security level L6. The multidimensional key with which that data is encrypted for storage on D2 may be completely derivable from class keys KD2, KC712 and KL6. For example, the multidimensional key may be formed as a cryptographic hash of these three class keys. Such an arrangement has the potential disadvantage that any data items associated with the same combination of classes will have the same multidimensional key. Thus, if the storage system 100 or a portion thereof is compromised or accidentally leaks the multidimensional key for a given data item, all other data items associated with the same combination of classes will also be compromised.

Alternatively, the multidimensional key for the given data item can illustratively comprise a unique key K encrypted using a function of the class keys KD2, KC712 and KL6. The three keys KD2, KC712 and KL6 could be hashed together to encrypt K with the result being included in the metadata.

As another example, K could be sequentially wrapped in an iterative manner using respective ones of the class keys. This may involve, for example, encrypting K with KD2, then encrypting the result with KC712, and then encrypting the result with KL6, and finally storing the result in the metadata.

Such arrangements can be used to ensure that each data item has its own unique multidimensional key. It should be noted that including the multidimensional key itself in the metadata increases the size of the metadata for each data item. However, it also has the additional advantage of making it easier to change the associated classes of a given data item with decrypting and re-encrypting that data item.

For example, assume that the given data item is encrypted with multidimensional key K, and {K} wrapper is stored in the metadata for that data item. If the class of the data item changes (e.g., a decision is made that the security level of that data should change), then only the metadata of the data item needs to change. More particularly, the multidimensional key K is stored in the metadata in encrypted form using a new wrapper derived from the new set of associated classes for the data item.

In order to read the given data item, the decryption module 124 recovers the multidimensional key for that data item. For example, if the multidimensional key was formed as a hash of the class keys KD2, KC712 and KL6, then the multidimensional key can be reconstructed from the class keys KD2, KC712 and KL6.

If the multidimensional key comprises the key K stored as metadata encrypted with a hash of the class keys KD2, KC17 and KL6, then the hash of the class keys KD2, KC17 and KL6 would be computed, and the metadata would be decrypted to recover K.

If the multidimensional key comprises the key K stored as metadata using the wrapper {{{{K}KD2}KC17}KL6, then K can be recovered by unwrapping first with KL6, then with KC712, and finally with KD2.

Again, these are just examples, and numerous other multidimensional key configurations can be used in other embodiments.

Moreover, the configuration of the storage array 102 in terms of the number of dimensions and the number of classes per dimension can be configured to accommodate various system constraints.

Accordingly, it should be understood that a wide variety of dimension and class arrangements are possible. For example, the dimension and class arrangements need not be symmetric or uniform in any way.

As noted above, an advantage of the example multidimensional key configurations described above is that shredding or other deletion of one or more classes of data items can be easily and efficiently achieved through deletion of the corresponding class keys and therefore without requiring decryption and re-encryption of any encrypted stored data items in any other ones of the classes.

For example, as mentioned previously, the key manager 104 in the present embodiment is illustratively configured to delete a given class of data items from the general storage 112 by simply deleting the corresponding class key. The key manager 104 can then generate a replacement class key to replace the deleted class key.

In an arrangement of this type, the data items in all other non-deleted classes in the general storage 112 remain unchanged as a result of the deletion of the given class, and therefore the data items of any such non-deleted classes need not be "rolled over" through application of decryption and re-encryption operations. Such an arrangement in some embodiments can provide a considerable performance improvement relative to conventional arrangements in which all stored data items are potentially subject to decryption and re-encryption operations upon deletion of a single data item.

The storage array 102 in the storage system 100 can be implemented utilizing storage arrays such as VNX® and Symmetrix VMAX®, both commercially available from EMC Corporation of Hopkinton, Mass.

However, storage systems with multidimensional key functionality as disclosed herein can be implemented using a wide variety of additional or alternative arrangements of storage devices. For example, a given storage system as the term is broadly utilized herein can comprise a plurality of scale-out network-attached storage (NAS) clusters. These NAS clusters may be implemented, for example, using Isilon® storage platforms, such as storage platforms comprising Isilon® platform nodes and associated accelerators in the S-Series, X-Series and NL-Series product lines, commercially available from EMC Corporation. Other storage products such as ViPR® Software-Defined Storage (SDS), ScaleIO™ and XtremIO™, all from EMC Corporation, can additionally or alternatively be used.

The key manager 104 in the storage system 100 illustratively comprises a key generator 120, an encryption module 122, a decryption module 124 and a key update controller 126. The key generator 120 more particularly comprises a class key generator 120A and a multidimensional key generator 120B utilized to generate respective class and multidimensional keys for use in encrypting data items for storage in the general storage 112. Additionally or alternatively, at least a subset of the class keys and the multidimensional keys can be supplied to the key manager from an external component of the storage system 100, although such a component is not explicitly shown in the figure. The encryption and decryption modules 122 and 124 are utilized to encrypt and decrypt data items in conjunction with storage in and retrieval from the general storage 112. The key update controller 126 illustratively controls updating of the class keys and multidimensional keys as needed in order to effect deletion of one or more selected classes of data items from the general storage 112.

It is to be appreciated that this particular arrangement of key manager modules illustrated in the FIG. 1 embodiment is presented by way of example only, and alternative arrangements can be used in other embodiments. For example, the functionality associated with the modules 120, 122, 124 and 126 in other embodiments can be combined into a single module, or separated across a larger number of modules.

The key manager 104 in the FIG. 1 embodiment is assumed to be implemented using at least one processing device. Each such processing device generally comprises at least one processor and an associated memory, and implements one or more functional modules for controlling certain features of the key manager 104.

More particularly, the key manager 104 in this embodiment comprises a processor 130 coupled to a memory 132 and a network interface 134.

The processor 130 illustratively comprises a microprocessor, a microcontroller, an application-specific integrated circuit (ASIC), a field-programmable gate array (FPGA) or other type of processing circuitry, as well as portions or combinations of such circuitry elements.

The memory 132 illustratively comprises random access memory (RAM), read-only memory (ROM) or other types of memory, in any combination. The memory 132 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, an integrated circuit containing electronic memory, or a wide variety of other types of computer program products comprising processor-readable storage media. The term "article of manufacture" as used herein should be understood to exclude transitory, propagating signals.

The network interface 134 allows the key manager 104 to communicate with the storage array 102 and possibly also with other system components not explicitly illustrated. For example, the key manager may be configured in some embodiments to communicate via network interface 134 with user devices and administrator terminals. The network interface 134 illustratively comprises one or more conventional transceivers.

At least portions of the key manager 104, such as portions of one or more of key generator 120, encryption module 122, decryption module 124 and key update controller 126, may be implemented at least in part in the form of software that is stored in memory 132 and executed by processor 130.

It is to be understood that the particular set of elements shown in FIG. 1 for configuring a storage system and associated key manager is presented by way of illustrative example only, and in other embodiments additional or alternative elements may be used. Thus, another embodiment may include additional or alternative systems, devices and other entities, as well as different arrangements of modules and other components.

For example, other embodiments can include an input-output controller coupled to the key manager 104 and configured to control storage of data items in the storage system 100. Such a controller can obtain keys from the key manager for use in encrypting data items for storage in the storage system. In an embodiment of this type, the encryption and decryption modules 122 and 124 can be implemented in the input-output controller rather than in the key manager 104 as shown in system 100 of FIG. 1. Alternatively, the input-output controller can include its own encryption and decryption modules, in addition to those of the key manager 104. Other placements of encryption and decryption modules are possible in other embodiments.

It is also possible that the key manager 104 can be implemented at least in part within the input-output controller, or that the input-output controller can be implemented at least in part within the key manager. Such arrangements are considered alternative couplings of the key manager and input-output controller. The input-output controller in other embodiments can be part of the storage array 102.

Communications between the various elements of storage system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the storage array 102 and the key manager 104 may be implemented using one or more processing platforms. A given such processing platform includes at least one processing device comprising a processor coupled to a memory, and the one or more processing devices may be implemented at least in part utilizing one or more virtual machines or other types of virtualization infrastructure such as Linux containers (LXCs) in association with underlying physical hardware.

It is to be appreciated that a given embodiment of the storage system 100 may include multiple instances of the storage array 102 and the key manager 104, although only a single instance of each of these elements is shown in the system diagram for clarity and simplicity of illustration.

Accordingly, the particular set of components implemented in the storage system 100 as illustrated in FIG. 1 is presented by way of example only. In other embodiments, alternative sets of components may be used, and such components may exhibit alternative functionality and configurations.

The operation of the storage system 100 will now be described in further detail with reference to the flow diagram of FIG. 2. The process as shown includes steps 200 through 208, and is suitable for use in the storage system 100 but is more generally applicable to other storage systems implementing functionality based on multidimensional keys determined as a function of class keys as disclosed herein.

It is assumed that the each of the dimensions 116 of the general storage 112 comprises a plurality of different classes of the set of classes 118. For example, as noted above, the dimensions may illustratively comprise one or more of storage drive, customer and security level. As mentioned previously, an arrangement with all three of these example dimensions may more particularly include j classes within the storage drive dimension, k classes within the customer dimension, and n classes within the security level dimension, such that there is a total of j+k+n class keys. However, other embodiments can utilize different types and configurations of class keys and associated multidimensional keys.

In step 200, a storage system is configured for storage of data items across a plurality of dimensions with each such dimension comprising a plurality of classes. As noted above, each of the dimensions 116 in general storage 112 of the FIG. 1 embodiment illustratively includes multiple distinct ones of the classes 118.

In step 202, class keys are assigned to respective ones of the classes of each of the dimensions. At least a portion of the class keys are generated by the class key generator 120A under the control of the key update controller 126. One or more class keys can alternatively be provided to the key manager 104 from another system entity.

In step 204, a given one of the data items associated with at least one of the classes in each of two or more of the dimensions is obtained. For example, an external user device or administrator terminal may provide a data item to the system 100 for storage in the general storage 112 of the storage array 102 in association with particular ones of a plurality of predetermined classes.

In step 206, the given data item is encrypted for storage in the storage system using a multidimensional key determined as a function of the class keys corresponding to respective ones of the classes with which that data item is associated. For example, the multidimensional key is illustratively determined by the multidimensional key generator 120B as a function of multiple class keys obtained from the class key generator 120A. The resulting multidimensional key is then utilized by the encryption module 122 to encrypt the given data item for storage in the general storage 112.

Steps 204 and 206 are repeated for each of one or more additional data items so as to encrypt multiple data items for each of the classes 118. The resulting encrypted data items are stored in encrypted form in the general storage 112.

In step 208, all of the encrypted stored data items associated with a given one of the classes are deleted by deleting the class key assigned to the given class. The selection of a given class of data items for deletion can be based on a variety of different factors. It should be noted in this regard that the term "deletion" is intended to be broadly construed, so as to encompass various arrangements for shredding a class of one or more data items or otherwise making the one or more data items of the class effectively unreadable. Such deletion in some embodiments is illustratively assumed to be irrevocable. Also, the term "deletion" as broadly used herein is intended to encompass modification of a class of one or more data items or other types of replacement of a class of one or more data items.

A replacement class key may be obtained to replace the deleted class key. The replacement class key is illustratively obtained from the key generator 120 under the control of the key update controller 126. Future data items associated with the deleted class can then be encrypted under new multidimensional keys that are generated based on the replacement class key and any other class keys associated with those data items.

As mentioned previously, illustrative embodiments such as that described above in conjunction with FIG. 2 permit deletion of a class of stored encrypted data items without requiring decryption and re-encryption of any data items in any other classes. Accordingly, none of the other non-deleted classes of data items need to be "rolled over" in conjunction with the deletion of the selected class of data items. This provides considerable efficiencies in deletion of stored encrypted data items from the general storage 112, thereby improving overall performance of the storage system 100.

In alternative embodiments, one or more selected classes of data, instead of being deleted as described in conjunction with step 208 above, can be sent or otherwise provided from the storage system 100 to a recipient, along with one or more corresponding class keys that permit the recipient to decrypt the encrypted data items of the one or more classes.

The particular processing operations and other system functionality described in conjunction with the flow diagram of FIG. 2 are presented by way of illustrative example only, and should not be construed as limiting the scope of the invention in any way. Alternative embodiments can use other types of processing operations involving multidimensional keys and associated class keys. For example, the ordering of the process steps may be varied in other embodiments, or certain steps may be performed concurrently with one another rather than serially. As additional examples, one or more of the process steps may be repeated periodically for different processing instances, and multiple such processing instances can be performed in parallel with one another within a given storage system.

Also, functionality such as that described in conjunction with the flow diagram of FIG. 2 can be implemented at least in part in the form of one or more software programs stored in memory and executed by a processor of a processing device such as a computer or server. As mentioned previously, a storage device or other memory having executable program code of one or more software programs embodied therein is an example of what is more generally referred to herein as a "processor-readable storage medium."

The foregoing embodiments are therefore illustrative only, and should not be viewed as limiting the scope of any particular embodiment in any way. Those skilled in the art will appreciate that numerous alternative multidimensional key arrangements can be used in other embodiments. For example, each dimension in a given embodiment can include different numbers and types of classes for categorization of data items.

Illustrative embodiments provide a number of significant advantages relative to conventional arrangements. For example, one or more such embodiments can provide particularly efficient shredding of selected classes of encrypted stored data items using multidimensional keys determined based on class keys. This substantially reduces the number of stored encrypted data items that need to be "rolled over" in conjunction with deletion of selected data items.

In addition, the total number of class keys in some embodiments is bounded by the sum of the number of classes over the various dimensions. This ensures that the disclosed arrangements are scalable to potentially large numbers of dimensions each including multiple classes, without requiring excessive amounts of protected storage.

Some embodiments advantageously provide at least one dimension that includes a linear arrangement of classes, thereby facilitating functionality such as redaction of information when sending encrypted data items to particular recipients.

As indicated previously, components of a storage system as disclosed herein can be implemented at least in part in the form of one or more software programs stored in memory and executed by a processor of a processing device. For example, at least portions of the key manager 104 and related functionality for generating and maintaining multidimensional keys and associated class keys for encrypted stored data items are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of storage systems and associated key managers. Also, the particular features of the illustrative embodiments of FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a storage system configured to store data items across a plurality of dimensions with each such dimension comprising a plurality of classes; and
a key manager associated with the storage system;
wherein the key manager is configured to assign class keys to respective ones of the classes of each of the dimensions;
wherein a given one of the data items associated with at least one of the classes in each of two or more of the dimensions is encrypted for storage in the storage system using a multidimensional key determined at least in part as a cryptographic function of the class keys corresponding to respective ones of the classes with which that data item is associated;
wherein the key manager is implemented utilizing at least one processing device comprising a processor coupled to a memory.

2. The apparatus of claim 1 wherein the key manager is at least partially incorporated within the storage system.

3. The apparatus of claim 1 wherein the storage system comprises at least one storage array.

4. The apparatus of claim 1 wherein at least one of the dimensions includes at least one class that has no assigned class key.

5. The apparatus of claim 1 wherein the total number of assigned class keys is bounded by a sum of the total numbers of classes in respective ones of the plurality of dimensions.

6. The apparatus of claim 1 wherein all of the data items associated with a given one of the classes are deleted by deleting the class key assigned to the given class.

7. The apparatus of claim 1 wherein encrypted data items are provided to a recipient along with a subset of the class keys selected to limit readability of the encrypted data items to only those of the encrypted data items that are associated with the provided subset of the class keys and thereby authorized to be read by the recipient.

8. The apparatus of claim 1 wherein the dimensions comprise two or more of storage drive, customer and security level.

9. The apparatus of claim 1 wherein the cryptographic function comprises a cryptographic hash of the class keys corresponding to respective ones of the classes with which that data item is associated.

10. The apparatus of claim 1 wherein the given data item has corresponding metadata indicating at least a subset of the classes with which that data item is associated.

11. The apparatus of claim 10 wherein the metadata for the given data item comprises the multidimensional key encrypted as a function of the class keys corresponding to respective ones of the classes with which that data item is associated.

12. The apparatus of claim 11 wherein the multidimensional key is encrypted using at least one of:
   a cryptographic hash of the class keys corresponding to respective ones of the classes with which the given data item is associated; and
   a sequential wrapping using the class keys corresponding to respective ones of the classes with which the given data item is associated.

13. The apparatus of claim 1 wherein the dimensions comprise respective disjoint subsets of the classes.

14. An apparatus comprising:
   a storage system configured to store data items across a plurality of dimensions with each such dimension comprising a plurality of classes; and
   a key manager associated with the storage system;
   wherein the key manager is configured to assign class keys to respective ones of the classes of each of the dimensions;
   wherein a given one of the data items associated with at least one of the classes in each of two or more of the dimensions is encrypted for storage in the storage system using a multidimensional key determined as a function of the class keys corresponding to respective ones of the classes with which that data item is associated;
   wherein at least one of the dimensions comprises a sequential arrangement of classes associated with respective hierarchically-arranged access levels such that an assigned class key for one of the classes corresponding to a particular access level permits readability of encrypted data items associated with that class as well as encrypted data items associated with classes corresponding to lower access levels; and
   wherein the key manager is implemented utilizing at least one processing device comprising a processor coupled to a memory.

15. The apparatus of claim 14 wherein the class key for the particular access level is determined as a cryptographic hash of the class keys for the lower access levels.

16. The apparatus of claim 14 wherein the class key for the particular access level is determined as a sequential wrapping of the class keys for the lower access levels.

17. The apparatus of claim 14 wherein only a single class key is stored for a highest one of the access levels and class keys for the lower access levels are determined by repeated application of a cryptographic hash to the single class key.

18. A method comprising:
   configuring a storage system for storage of data items across a plurality of dimensions with each such dimension comprising a plurality of classes;
   assigning class keys to respective ones of the classes of each of the dimensions;
   obtaining a given one of the data items associated with at least one of the classes in each of two or more of the dimensions; and
   encrypting the given data item for storage in the storage system using a multidimensional key determined at least in part as a cryptographic function of the class keys corresponding to respective ones of the classes with which that data item is associated;
   wherein the configuring, assigning, obtaining and encrypting are implemented utilizing at least one processing device comprising a processor coupled to a memory.

19. The method of claim 18 further comprising deleting a plurality of stored encrypted data items associated with a given one of the classes from the storage system by deleting the class key assigned to the given class.

20. A non-transitory processor-readable storage medium having stored therein program code of one or more software programs, wherein the program code when executed by at least one processing device causes said processing device:
   to configure a storage system for storage of data items across a plurality of dimensions with each such dimension comprising a plurality of classes;
   to assign class keys to respective ones of the classes of each of the dimensions;
   to obtain a given one of the data items associated with at least one of the classes in each of two or more of the dimensions; and
   to encrypt the given data item for storage in the storage system using a multidimensional key determined at least in part as a cryptographic function of the class keys corresponding to respective ones of the classes with which that data item is associated.

21. The processor-readable storage medium of claim 20 wherein a plurality of stored encrypted data items associated with a given one of the classes are deleted from the storage system by deleting the class key assigned to the given class.

* * * * *